3,277,077
3-DEOXY RIBOFURANOSYL HALIDES
Frederick W. Holly, Cranford, and Edward Walton, Scotch Plains, N.J., assignors to Merck & Co., Inc., Rahway, N.J., a corporation of New Jersey
No Drawing. Filed June 3, 1964, Ser. No. 372,367
16 Claims. (Cl. 260—209)

This invention relates generally to novel furanosides and more particularly to novel ribofuranosides and methods for preparing them. Specifically, it relates to the preparation of novel diacylated 3-deoxy ribofuranosyl halides useful in the preparation of nucleosides, and novel compounds obtained in the preparation of said halides.

The compounds of the present invention are 2,5-di-O-acyl-3-deoxy-D-ribofuranosyl halides and may be depicted structurally as

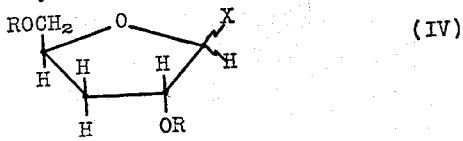

where X is a halogen atom in either the α or β configuration and R is the acyl residue of an organic carboxylic acid such as alkanoyl, aroyl, substituted aroyl, and represented further by acetyl, propionyl, butyryl, benzoyl, nitrobenzoyl, and the like. Typical of such compounds are the following:

2,5-di-O-benzoyl-3-deoxy-D-ribofuranosyl chloride,
2,5-di-O-benzoyl-3-deoxy-D-ribofuranosyl bromide,
2,5-di-O-acetyl-3-deoxy-D-ribofuranosyl bromide,
2,5-di-O-acetyl-3-deoxy-D-ribofuranosyl chloride,
2,5-di-O-(p-nitrobenzoyl)-3-deoxy-D-ribofuranosyl bromide,
2,5-di-O-(p-nitrobenzoyl)-3-deoxy-D-ribofuranosyl chloride,
2,5-di-O-propionyl-3-deoxy-D-ribofuranosyl bromide,
2,5-di-O-propionyl-3-deoxy-D-ribofuranosyl chloride,
2,5-di-O-butyryl-3-deoxy-D-ribofuranosyl bromide, in either the α or β form, and the like. Preferred among the foregoing are 2,5-di-O-acetyl-3-deoxy-D-ribofuranosyl bromide and chloride, 2,5-di-O-benzoyl-3-deoxy-D-ribofuranosyl bromide and chloride, and 2,5-di-O-(p-nitrobenzoyl)-3-deoxy-D-ribofuranosyl bromide and chloride, and most preferred are the β forms of these.

The preparation of compounds IV according to the process of the present invention is illustrated structurally by the following flow diagram:

wherein R and X are as previously defined and R″ is an alkyl radical. As can be seen, the starting material used in preparing compounds IV is an alkyl glycoside in the epoxy form and in the β,D configuration. Representative of such starting materials are methyl 2,3-anhydro-β-D-ribofuranoside, ethyl 2,3-anhydro-β-D-ribofuranoside, pentyl 2,3-anhydro-β-D-ribofuranoside, and decyl 2,3-anhydro-β-D-ribofuranoside. The alkyl compounds may be produced according to the procedure of C. D. Anderson, L. Goodman, and B. R. Baker, J. Am. Chem. Soc., 80, 5247 (1958), by the use of the appropriate aliphatic alcohol in place of methanol as described therein.

In general, the process involves reducing the epoxy group of the ribofuranoside in Step A to obtain the 3-deoxy derivative. After this compound is obtained, the hydroxyl groups in the 2- and 5-positions are blocked with acyl groups to protect them when the compounds are subsequently treated in Step C. These acyl groups, as will be apparent hereinafter, are later removed when compounds IV are converted into nucleosides having antibacterial activity.

More specifically, the process of the present invention contemplates, in Step A thereof, the hydrogen reduction of the epoxy riboside in the presence of a Raney nickel catalyst. In this step, the ribofuranoside is preferably dissolved in an appropriate solvent and treated under pressure with hydrogen and with Raney nickel to effect the reduction. The temperature is critical and must be above about 35° C., suitable results being obtained within the range of from 35° C.–150° C. The preferred temperature, however, is from 55° C. to about 110° C. Temperatures higher than those indicated may be employed if desired, although no advantageous effect is observed under such conditions. With regard to the solvents, any hydrogenation solvent which is effective with the ribofuranoside will, in general, be suitable. Such solvents as lower aliphatic alcohols, such as methanol, ethanol, ethers such as diethyl, and dibutyl ether, dioxane, tetrahydrofuran, cyclohexane, and the like may be employed, with ethanol being preferred. The pressure at which the hydrogenation is run is not critical. It is preferred to employ pressures in the range of from slightly above atmospheric to about 100 p.s.i.g. Under such conditions, the reaction is normally complete within several hours. It is most preferred to introduce the desired amount of hydrogen batchwise and allow the pressure to drop as the hydrogen uptake proceeds, although the reac-

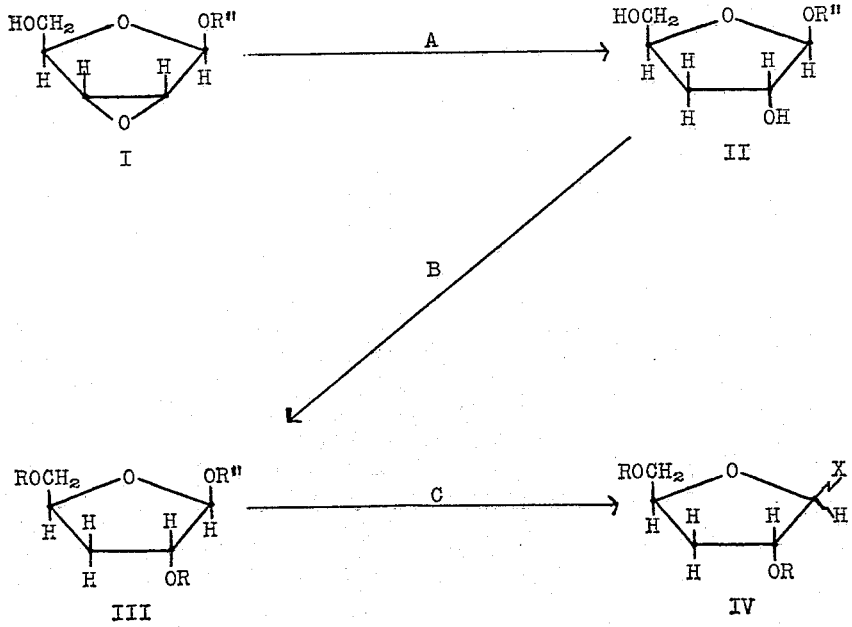

tion may be carried out in a continuous fashion if desired. At the conclusion of the reaction, the catalyst may be separated by filtration and the solvent removed by flash vaporization and the product obtained washed in accordance with known techniques. The alkyl ribosides obtained as a result of carrying out this step of the process are novel and are generally in the form of oils. They are normally isolated before treatment for purposes of purification, although it is not necessary to do so. Illustrative of the novel compounds are methyl-3-deoxy-β-D-ribofuranoside, ethyl-3-deoxy-β-D-ribofuranoside, propyl-3-deoxy-β-D-ribofuranoside, and butyl-3-deoxy-β-D-ribofuranoside.

The alkyl ribosides obtained in Step A are next treated so as to block the 2,5-hydroxyl groups thereof and prevent their reaction upon subsequent conversion to the halide. This treatment involves acylation of the alkyl riboside. The preferred acylating agents are the acid halides and anhydrides containing the appropriate acyl residue. Thus, there may be employed alkanoyl, aroyl, and substituted aroyl halides, or appropriate acid anhydrides. These are exemplified by acetyl chloride, acetyl bromide, propionyl chloride, acetic anhydride, propionic acid anhydride, butyric acid anhydride, benzoyl bromide, benzoyl chloride, benzoic anhydride, p-nitrobenzoyl bromide, p-nitrobenzoyl chloride, and p-nitrobenzoic anhydride. The preferred reactions are a benzoylation and acetylation with a benzoyl chloride and acetic anhydride respectively. It is preferred to run the acylation in the presence of a solvent and since the reaction involves the evolution of a mode of hydrogen halide it is most preferred to use a basic solvent. Preferred are the tertiary amine-type solvents such as pyridine, N,N-diethylaniline, triethylamine, and although other vehicles such as water and benzene may be used in conjunction with either organic or inorganic bases and will produce suitable results. The reaction proceeds suitably at room temperature although temperatures within the range of from 15° C. up to 45° C. may be employed. The temperature, however, is not critical and any may be employed having due consideration for the stability of the reaction system where higher temperatures are involved, and considering the economics of the reaction rate at lower temperatures. After the reaction is complete, the products are preferably extracted into a selective solvent such as ethers, esters the halogenated aliphatic solvents, represented by chloroform, ethylene, chloride, and the like. The extract may then be concentrated to yield the final acylated product. The aroyl and substituted aroyl ribofuranosides according to this step, and represented by 2,5-di-O-benzoyl and 2,5-di-O-(p-nitrobenzoyl)-ribofuranoside, are novel compounds.

In Step C of the process, the ribofuranosides obtained from Step B are treated under anhydrous conditions to introduce a halogen atom at the 1-carbon position of the compound using an agent which yields a halogen anion in the presence of a strong acid. Such agents as hydrogen bromide, hydrogen cholride, thionyl bromide, thionyl chloride, metal halides, and the like, are suitable with hydrogen chloride and hydrogen bromide being preferred. In the case of hydrogen halides and thionyl halides, these reagents act as both the source of the halogen anion and the strong acid. The temperature of the reaction is not critical and good results are obtained at from 0–25° C. Temperatures outside the range may be employed with due consideration given to stability and economics as above described. The preferred operating temperature is about 15–20° C. The reaction itself is slightly exothermic and fairly rapid, being completed in about 20 minutes or less. Thereafter, the reaction mass is concentrated and excess solvent removed at reduced pressure. With respect to solvents, it is preferred to employ inert solvents, but the solvents themselves are not critical. Such solvents as ethers, aromatic hydrocarbons such as benzene, toluene, xylene, lower aliphatic acids such as acetic acid, and the like are suitable.

Compounds IV may be converted into the well-known antibiotic 3'-deoxyadenosine, also known as Cordycepin. This is so irrespective of the particular configuration about the 1-carbon atom in compounds IV. Cordycepin has been described as being an antibacterial agent having particular efficacy against *B. subtilis* and against Avian tubercle bacillus, the microorganism which causes tuberculosis in chickens. Cordycepin has the following structural formula:

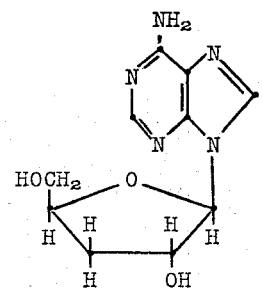

In accordance with another aspect of the present invention, Cordycepin is prepared through a process which itself yields novel derivatives of the haloribosides (compounds IV). This additional aspect involves treating compounds IV with 9-chloromercuri-6-benzamidopourine preferably in a liquid vehicle, either in solution or as a suspension to yield a material of the following formula:

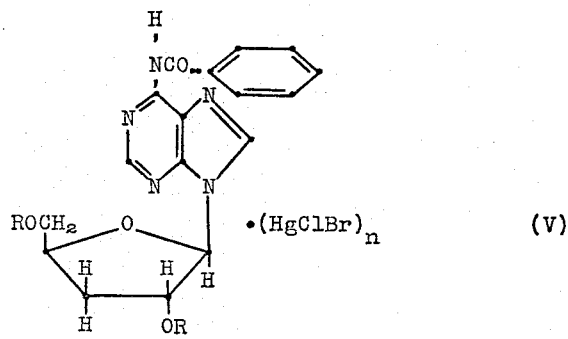

where R is as previously assigned, and $n$ is 0 or 1. Such liquid vehicles as benzene, toluene, and xylene are suitable materials for the reaction. The particular vehicle is not critical and any may be employed. Compounds V are novel and are designated generally as the mercury chlorobromides of 6-benzamido-9-(2',5'-di-O-acyl-3'-deoxy-β-D-ribofuranosyl)purines when $n$ is 1. If desired, the material may be treated to remove the mercury chlorobromide moiety by dissolving it in a suitable solvent such as chloroform and then treating the solution with hydrogen sulfide or potassium iodide. In such a case, $n$ is 0. This treatment results in the des-mercury chlorobromide analogs of compounds V and are themselves novel.

Either compounds V or their des-mercury chlorobromides are then saponified to remove the acyl groups therefrom, as for example by treating them with an alkali metal alkoxide solution such as that obtained from sodium or potassium and methanol, ethanol, and the like. This treatment yields Cordycepin irrespective of whether compounds V or the des-mercury chlorobromide salt is used as the starting material. In its preferred practice, the invention involves treating compounds V, with $n$ equal to zero, rather than the mercury chlorobromide analogs in the conversion to Cordycepin.

Compounds V are represented by 6-benzamido-9-(2',5'-di-O-benzoyl-3'-deoxy-β-D-ribofuranosyl)purine,
6-benzamido-9-(2',5'-di-O-acetyl-3'-deoxy-β-D-ribofuranosyl)purine, and 6-benzamido-9-(2′,5′-di-O-p-nitrobenzoyl-3′-deoxy-β-D-ribofuranosyl)purine, and the mercury chlorobromides thereof.

The following examples are given for purposes of illustration only and are not intended to limit the scope of the present invention.

EXAMPLE 1

*Methyl-3-deoxy-β-D-ribofuranoside*

A solution of 1 g. (6.8 mmole) of methyl 2,3-anhydro-β-D-ribofuranoside in 50 ml. of ethanol is shaken in an atmosphere of hydrogen with 0.25 tsp. (approximately 0.75 g.) of Raney nickel catalyst at 80° C. The initial hydrogen pressure is 40 p.s.i.g. The reaction is complete after 12 hours as indicated by the uptake of the theoretical amount of hydrogen.

The resulting mixture is filtered, the catalyst washed with hot ethanol, and the combined ethanol solutions concentrated at about 25 mm. of mercury pressure. The product, methyl-3-deoxy-β-D-ribofuranoside, is obtained as an oil in 1.13 g. yield. Its infrared absorption spectrum shows bands at 2.92μ (OCH₃) and essentially no band at 11.5μ

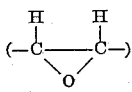

Confirmatory characterization of the deoxy riboside is obtained by NMR spectroscopy.

The corresponding ethyl, propyl, hexyl, or decyl ribofuranosides are obtained when the above procedure is repeated using equivalent amounts of the ethyl, propyl, hexyl, or decyl anhydro ribofuranoside in place of methyl 2,3-anhydro-β-D-ribofuranoside.

EXAMPLE 2

*Methyl-3-deoxy-β-D-ribofuranoside*

Methyl 2,3-anhydro-β-D-ribofuranoside (10.03 g., 0.0688 mole) and 2.5 teaspoonfuls of Raney nickel in 500 ml. of ethanol is shaken at 80° C. under hydrogen at about 40 p.s.i.g. for six hours. The pressure drop is 25 lbs. compared to a theoretical drop of 15 lbs. The catalyst is filtered and washed with 4 x 50 ml. of hot ethanol. The filtrate is evaporated at about 25 mm. of mercury pressure to yield 11.0 g. of the crude oily product. Excess ethanol in the crude product is removed by successive evaporation of two 15 ml. portions of dry toluene at 25 mm. of mercury pressure.

EXAMPLE 3

*Methyl 2,5-di-O-acetyl-3-deoxy-β-D-ribofuranoside*

To a solution of 1.13 g. of methyl-3-deoxy-β-D-ribofuranoside in 13.7 ml. of dry pyridine, 2.7 ml. of acetic anhydride is added. The solution is kept at room temperature for 16 hours. Thereafter, 0.55 ml. of water is added with cooling and stirring. After about one hour, 55 ml. of chloroform is added and the solution is extracted with aqueous sodium bicarbonate until neutral. The chloroform solution is dried over magnesium sulfate, filtered and concentrated to give 1.69 g. of methyl 2,5-di-O-acetyl-3-deoxy-β-D-ribofuranoside which is characterized by infrared and NMR spectroscopy.

EXAMPLE 4

*Methyl 2,5-di-O-benzoyl-3-deoxy-β-D-ribofuranoside*

Methyl-3-deoxy-β-D-ribofuranoside (5.0 g., 0.337 mole) is dissolved in 125 ml. of pyridine which has previously been dried over BaO, and the resulting solution cooled in an ice bath. Benzoyl chloride (11.7 ml., 0.161 mole) is added dropwise with magnetic stirring and cooling. A white solid (pyridine hydrochloride) comes out of solution during the addition. The mixture is stirred at —5° C. for one hour and stored at room temperature overnight. Water (1.25 ml.) is added with cooling and stirring and the mixture is evaporated to about 50 ml. at 25 mm. of mercury pressure. The concentrate is diluted with 125 ml. of chloroform and washed with 6 x 45 ml. of 1 M NaHCO₃ solution and once with 50 ml. of water. The chloroform layer is dried over MgSO₄, filtered, and rotated to 11.77 g. of the oily product which crystallizes at room temperature.

The infrared spectrum in chloroform shows a benzoate band at 5.85μ and a weak band at 5.6μ.

The crude product is recrystallized once from 110 ml. of n-hexane to give 8.1 g. (67%) product, M.P. 80–81°. The IR shows no 5.6μ band. [α]$_D$=—32.2°, [α]$_{546}$=—39.8° (C., 1.7% in CHCl₃).

EXAMPLE 5

*2,5-di-O-benzoyl-3-deoxy-D-ribofuranosyl bromide*

A 33.8% solution of hydrogen bromide in acetic acid is prepared by dissolving 9.0 g. of hydrogen bromide in 17.6 g. of acetic acid.

To a solution of methyl 2,5-di-O-benzoyl-3-deoxy-β-D-ribofuranoside (2.0 g.; 5.62 mm.) in 10 ml. of acetic acid, is added 1 ml. acetyl bromide with cooling in an ice bath. Ten milliliters of the freshly prepared hydrogen bromide solution is next added and the solution is allowed to stand at room temperature for 20 minutes. The pale yellow solution is evaporated under 25 mm. of mercury pressure, keeping the water bath temperature at 30° C. Five 15 ml. portions of dry toluene are evaporated from the residual product at about 25 mm. of mercury pressure.

EXAMPLE 6

*Methyl 2,5-di-O-(p-nitrobenzoyl)-3-deoxy-β-D-ribofuranoside*

A solution of 2.0 g. (13.5 mmoles) of methyl-3-deoxy-β-D-ribofuranoside in 50 ml. of dry pyridine at 0° C. is stirred and treated with 7.5 g. (40.5 mmoles) of p-nitrobenzoyl chloride. The mixture is stirred at 25° C. for 20 hours, concentrated at a pressure of about 25 mm. of mercury to a volume of about 20 ml., and then diluted with 100 ml. of chloroform. The chloroform solution is washed with three 50-ml. portions of saturated sodium bicarbonate and 50 ml. of water. The dried (MgSO₄) chloroform solution is concentrated at reduced pressure to 7 g. of residual oily product. The oil is crystallized from 10 ml. of benzene by adding petroleum ether. Product (4.6 g.) melting at 106–109° is obtained. Recrystallization of 4.2 g. from a small amount of benzene by adding petroleum ether gives 4.19 g. (75%) of methyl 2,5-di-O-(p-nitrobenzoyl)-3-deoxy-β - D - ribofuranoside, M.P. 108–110°. [α]$_D$=—33.1, [α]$_{578}$=—34.5 (c., in CHCl₃).

$$\lambda_{max.}^{MeOH} \ 269\mu \ (a\ 27{,}000).$$

*Anal.*—Calcd. for C₂₀H₁₈N₂O₁₀ (446.4): C, 53.81; H, 4.06; N, 6.28. Found: C, 53.83; H, 3.91; N, 6.29.

EXAMPLE 7

*2,5-di-O-(p-nitrobenzoyl)-3-deoxy-β-D-ribofuranosyl bromide*

A warm solution of 3.8 g. (8.51 mmoles) of methyl 2,5-di-O-(p-nitrobenzoyl)-3-deoxy-β-D-ribofuranoside in 16 ml. of acetic acid is cooled to 10° and treated with one ml. of acetyl bromide. Sixteen milliliters of cold 33% (w./w.) hydrogen bromide in acetic acid solution is added and the mixture kept at 10° for 20 minutes during which time a solid precipitates. The reaction is complete in about 10 minutes. The reaction mixture is concentrated to dryness and three 20-ml. portions of dry toluene are removed at a reduced pressure of about 25 mm. of mercury to remove last traces of hydrogen bromide and acetic acid. The crystalline residue (M.P. 118–124°) is recrystallized from 20 ml. of methylene chloride and 40 ml. of ether which gives 3.4 g. (81%) of 2,5-di-O-(p-nitrobenzoyl)-3-deoxy-β-D-ribofuranosyl bromide, M.P. 128–

131°. [α]_D = −99°, [α]_{578} = −105° (conc. 1.18% in CH_2Cl_2).

$\lambda^{CH_2Cl_2}_{max.}$ 261μ (a 28,900)

*Anal.*—Calcd. for C_{19}H_{15}BrN_2O_9 (495.3): C, 46.08; H, 3.05; Br, 16.14; N, 5.66. Found: C, 46.04; H, 2.79; Br, 16.44; N, 5.88.

EXAMPLE 8

*2,5-di-O-acetyl-3-deoxy-D-ribofuranosyl bromide*

To a solution of 2 g. (8 mmoles) of methyl 2,5-di-O-acetyl-β-D-ribofuranoside dissolved in 10 ml. of acetic acid, 1 ml. of acetyl bromide is added. The solution is maintained at about 20° C. by use of a cooling bath. Ten milliliters of a 32% (w./w.) solution of hydrogen bromide in acetic acid is added. After this solution remains at about 25° C. for 20 minutes, it is concentrated to an oil. Toluene is added and removed at a pressure of about 25 mm. of mercury, the process being repeated three times. The residual oil weighs 2.4 g. and contains 2,5-di-O-acetyl-3-deoxy-D-ribofuranosyl bromide, and is characterized by its infrared and NMR spectra. It may be directly used in this form in condensation reactions with chloromercuri-6-benzamidopurine.

EXAMPLE 9

*2,5-di-O-acetyl-3-deoxy-D-ribofuranosyl chloride*

A solution of 1 g. (4.1 mmole) of methyl 2,5-di-O-acetyl-3-deoxy-β-D-ribofuranoside in 5 ml. of acetic acid is treated with 1 ml. of acetyl chloride. A solution of 2 g. of hydrogen chloride in 12 g. of acetic acid is added at ice temperature and the solution kept at about 5° C. for about 70 hours. It is thereafter concentrated to a dark oil at a pressure of about 25 mm. of mercury. Xylene (about 5 to 10 ml.) is added and the solution is concentrated. This xylene washing is repeated three times. The residue containing 2,5-di-O-acetyl-3-deoxy-D-ribofuranosyl chloride is suitable for use in the next step (condensation).

EXAMPLE 10

*2,5-di-O-benzoyl-3-deoxy-D-ribofuranosyl chloride*

A solution of 2.0 g. (5.6 mmoles) of methyl 2,5-di-O-benzoyl-β-D-ribofuranoside in 10 ml. of acetic acid is cooled and treated with 1 ml. of acetyl chloride. A cold solution of 4.0 g. of hydrogen chloride in 25 ml. of acetic acid is added and the solution kept at 5° C. for 20 hours. The solution is concentrated at a pressure of about 25 mm. of mercury at less than 40° C. Two 10-ml. portions of dry toluene are distilled from the residue at about 25 mm. of mercury pressure. The residue (2.4 g.) containing 2,5-di-O-benzoyl-3-deoxy-D-ribofuranosyl chloride is suitable for condensation with chloromercuri-6-benzamidopurine.

EXAMPLE 11

A. *6-benzamido-9-(2',5'-di-O-benzoyl-3'-deoxy-β-D-ribofuranosyl)purine·mercury chlorobromide complex*

A stirred suspension of 1.33 g. (2.81 mm.) of finely powdered chloromercuri-6-benzamidopurine in 110 ml. of xylene is distilled until all moisture is removed. Then an additional 25 ml. of xylene is removed and reserved. The suspension is cooled to room temperature and then 1 g. (2.81 mm.) of freshly prepared 2,5-di-O-benzoyl-3-deoxy-D-ribofuranosyl bromide dissolved in the 25 ml. of dry xylene is added and the mixture heated to a reflux temperature of about 140° C.

Before the mixture reaches reflux, the suspended solid becomes gummy. This gum then dissolves leaving a cloudy solution. The mixture is refluxed for a total of 35 minutes. After refluxing, about 0.2 g. of unreacted starting material remains. This is removed by filtering the hot mixture.

To the filtrate is added 125 ml. of petroleum ether as a result of which a white semi-solid precipitates. The xylene-petroleum ether mixture is cooled for one hour in an ice bath and the semi-solid collected by filtration and washed with 2 x 50 ml. of petroleum ether. The air dried product, 6-benzamido-9-(2',5'-di-O-benzoyl-3'-deoxy - β - D - ribofuranosyl)purine·mercury chlorobromide complex weighs 1.75 g., and analyzes for C_{31}H_{25}N_5O_6+HgBrCl (M.W. 879.5) (71% of starting 2,5-di-O-benzoyl-3-deoxy-D-deoxy-ribofuranosyl bromide) as follows): Calc.: C, 42.33; H, 2.86; N, 7.96; Br, 9.09; Cl, 4.03. Found: C, 42.86; H, 2.70; N, 8.64; Cl, 4.60.

U.V. spectra:                                                          μ
   λ_{max} Ch_3OH—H_2O _____ 280
   λ_{max} H approx. 4 _____ 290
   λ_{max} pH approx. 13 _____ 280, 302

B. *3'-deoxyadenosine*

To a partial solution of 0.2817 g. (5 mm.) of 6-benzamido - 9 - (2',5' - di - O - benzoyl - 3' - deoxy - β - D-ribofuranosyl)purine in 4.4 ml. of dry methanol is added a solution of 16.1 mg. (7 mm.) of sodium in 2.4 ml. of dry methanol.

On addition of the sodium methylate to the methanol solution, a solid precipiates, which slowly dissolves during the reflux period. The mixture is refluxed overnight, cooled to room temperature, and adjusted to pH 6–7 with glacial acetic acid. The insoluble material (50 mg.) is removed by filtration and gives a positive mercury test with H_2S.

The methanol is removed under pressure of about 25 mm. of mercury and the residue is dissolved in 4 ml. of water. The aqueous solution is extracted with 4 x 2 ml. of chloroform and the water removed at a bath temperature of 30° C. at a pressure of about 25 mm. of mercury.

The solid residue is redissolved in 1 ml. of water, seeded and kept at room temperature several hours. Crystals form immediately and are collected by filtration and washed with 3 x 2 ml. of cold water. This gives a first crop product, 3'-deoxyadenosine of 29.5 mg., M.P. (darkening slightly at 200°) 222–225° C. Thin layer chromatography (cellulose) system —H_2O shows one spot Rƒ 0.4. [α]_D (c., 2 in H_2O) —48.7°.

A second crop of 8.8 mg. is obtained by concentrating the filtrate to ½ ml. and storing at 5° C. overnight. One spot by thin layer chromatography Rƒ 0.4.

Spectral data:

$\lambda^{H_2O}_{max.}$ 260μ, E% 528, 207.5μ, E% 760

Infrared (solid state): Identical to standard.

EXAMPLE 12

A. *6 - benzamido - 9 - (2',5' - di - O - acetyl - 3' - deoxy-β-D-ribofuranosyl)purine*

A suspension of 3.7 g. (7.8 mmoles) of chloromercuri-6-benzamidopurine in 350 ml. of xylene is distilled until 250 ml. of xylene remains. After the mixture is cooled to about 25° C., 2.4 g. of 2,5-di-O-acetyl-3-deoxy-D-ribofuranosyl bromide dissolved in 25 ml. of dry xylene are added. The mixture is refluxed for 10 to 20 minutes, filtered while still warm, and the collected solid washed with xylene. An additional 1.4 g. precipitate is obtained from the cooled filtrate. The filtrate is concentrated, the residue dissolved in hot chloroform, and petroleum ether added yielding a 1.8 g. precipitate.

Combination of the two precipitates gives 3.2 g. of product containing 6-benzamido-9-(2',5'-di-O-acetyl-3'-deoxy-β-D-ribofuranosyl)purine mercuric halide salt.

A solution of 1.5 g. of this material in 50 ml. of chloroform is washed with 30% potassium iodide solution and water. The chloroform layer is concentrated to a residue of 900 mg. (53%) of 6-benzamido-9-(2',5'-di-O-acetyl- 3'-deoxy-β-D-ribofuranosyl)purine. A negative test with hydrogen sulfide shows that the mercuric halide portion is removed.

B. 3'-Deoxyadenosine

A solution of 900 mg. (2.0 mmoles of 6-benzamido-9-(2',5' - di - O-acetyl-3'-deoxy-β-D-ribofuranosyl)purine in 10 ml. of methanol is treated with a solution of 120 mg. of sodium in 10 ml. of methanol and the mixture refluxed for three hours. The reaction mixture is concentrated to dryness at reduced pressure (25 mm. of mercury) and the residue dissolved in about 25 ml. of water and acidified with acetic acid to pH 6.5. The water solution is washed with two 10-ml. portions of chloroform and treated with a solution of 600 mg. of picric acid in 15 ml. of hot water. On cooling 458 mg. (48%) of 3'-deoxyadenosine picrate precipitates.

A total of 225 mg. of the picrate is added portionwise to a suspension of about 1 g. of DOW 2X8, a basic styrene, quaternary ammonium type anion exchange resin of medium porosity, in 10 ml. of warm water. The mixture is filtered and the resin washed with several portions of warm water. The colorless filtrate and washings are concentrated to dryness and the residue (117 mg.) is crystallized from 2 ml. of water. 3'-deoxyadenosine (80 mg.; 68%) melting at 121–124° C. is obtained.

EXAMPLE 13

*6-benzamido-9-(2',5'-di-O-benzoyl-3'-deoxy-β-D-ribofuranosyl)purine*

About 100 ml. of xylene is distilled from a suspension of 2.66 g. (5.62 mmoles) chloromercuri-6-benzamidopurine in 220 ml. xylene in order to remove last traces of water. The resulting suspension is cooled to room temperature and stirred while a solution of 2.12 g. (5.62 mmole) of 3-deoxy-2,5-di-O-benzoyl-β-D-ribofuranosyl bromide in 25 ml. of dry xylene is added. The character of the suspended material changes from a fine white particulate solid to a flocculant slurry. The mixture is stirred and refluxed for 30 minutes during which time most of the suspended solid dissolves. The reaction mixture is filtered while hot to remove 0.6 g. of solid. The filtrate, when partially cooled, is diluted with 400 ml. of petroleum ether. After being cooled at 5° C. for 30 minutes, the mixture is filtered and the solid washed with two 50-ml. portions of petroleum ether. Testing a small sample with hydrogen sulfide shows that the amorphous solid (3.8 g.) contains mercury. Thin layer chromatography on silica in ethylacetate-acetone (1:1) shows two U.V. absorbing spots of R$f$ 0.7 (weak) and 0.95 (strong).

*Analysis.*—Calc. for $C_{31}H_{25}N_5O_6HgBrCl$ (879.5): C, 42.33; H, 2.86; N, 7.96; Cl, 4.03. Found: C, 42.93; H, 2.78; N, 8.30; Cl. 3.92.

The solid obtained above is dissolved in 100 ml. of chloroform and washed with three 30-ml. portions of 30% potassium iodide solution and two 30-ml. portions of water. The dried chloroform solution is concentrated at a pressure of about 25 mm. of mercury to a glass (2.9 g.). Thin layer chromatography on silica in ethyl acetate-acetone (1:1) shows U.V. absorbing spots: R$f$ 0.9 (strong, product), 0.43 (weak, 6-benzamidopurine).

A 400-mg. portion of the product is chromatographed on a short column of silica in ethylacetate-acetone (4:1). Combination of appropriate fractions (homogeneous on thin layer chromatography) gives, after concentration, 300 mg. of amorphous 6-benzamido-9-(2',5'-di-O-benzoyl-3'-deoxy-β-D-ribofuranosyl)purine. [α]$_D$ +49° (c., 1 in CHCl$_3$).

$\lambda_{max.}^{EtOH}$ 281μ (a 23,300), 264μ (a 15,200), 231μ (a 42,500)

*Anal.*—Calc.: for $C_{31}H_{25}N_5O_6$ (562.55): C, 66.06; H, 4.47; N, 12.43. Found: C, 65.52; H, 4.71; N, 12.37.

EXAMPLE 14

*6-benzamido-9-(2',5'-di-O-acetyl-3'-deoxy-β-D-ribofuranosyl)purine*

A suspension of 1.8 g. of 6-benzamidopurine mercuri chloride in 170 ml. of xylene is dried by distilling about 50 ml. of xylene. A solution of 1.2 g. of 2,5-di-O-acetyl-3-deoxy-D-ribofuranosyl chloride in 25 ml. of dry xylene is added and the mixture is stirred and refluxed for one hour after which the hot mixture is filtered. After being partially cooled the filtrate is diluted with an equal volume of petroleum ether (B.P. 30–60°) and the mixture cooled to 5° C. It is then filtered and 1.4 g. of solid containing 6-benzamido - 9 - (2',5'-di-O-acetyl-3'-deoxy-β-D-ribofuranosyl)purine mixed with mercuric chloride is obtained. This is dissolved in 50 ml. of chloroform and washed with two 30-ml. portions of 30% potassium iodide solution and two 20-ml. portions of water. The chloroform layer, after drying over MgSO$_4$, is concentrated at a pressure of about 25 mm. of mercury to give a residue of 720 mg. (43%) of 6-benzamido-9-(2',5'-di-O-acetyl-3'-deoxy-β-D-ribofuranosyl)purine.

EXAMPLE 15

*6-benzamido-9-(2',5'-di-O-benzoyl-3'-deoxy-β-D-ribofuranosyl)purine*

About 150 ml. of xylene is distilled from a suspension of 1.31 g. (2.7 mmoles) of chloromercuri-6-benzamidopurine in 110 ml. of xylene. The suspension is cooled to 25° C. and treated with a solution of 1 g. (2.7 mmoles) of 2,5-di-O-benzoyl-3-deoxy-D-ribofuranosyl chloride in 12.5 ml. of dry xylene. The mixture is stirred and refluxed for one hour. The hot suspension is filtered and the filtrate diluted with an equal volume of petroleum ether. The solid (840 mg.) is removed by filtration, dissolved in 100 ml. of chloroform, and washed with two 30-ml. portions of 30% potassium iodide solution. The chloroform layer is dried over MgSO$_4$ and concentrated, at reduced pressure, to give a residue of 590 mg. (39%) of 6-benzamido - 9-(2',5'-di-O-benzoyl-3'-deoxy-β-D-ribofuranosyl)purine.

Any departure from the above description which conforms to the present invention is intended to be included within the scope of the claims.

What is claimed is:

1. Compounds of the formula

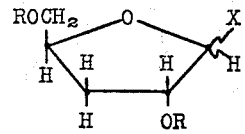

where X is a bromine or chlorine atom and R is selected from the group consisting of lower alkanoyl, aroyl, and substituted aroyl groups.

2. 2,5-di-O-acetyl-3-deoxy-D-ribofuranosyl bromide.
3. 2,5-di-O-acetyl-3-deoxy-D-ribofuranosyl chloride.
4. 2,5-di-O-benzoyl-3-deoxy-D-ribofuranosyl bromide.
5. 2,5-di-O-benzoyl-3-deoxy-D-ribofuranosyl chloride.
6. 2,5 - di-O-(p-nitrobenzoyl)-3-deoxy-D-ribofuranosyl bromide.
7. 2,5 - di-O-(p-nitrobenzoyl)-3-deoxy-D-ribofuranosyl chloride.
8. Compounds of the formula

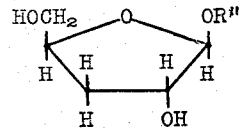

wherein R″ is a lower alkyl group.

9. Methyl-3-deoxy-β-D-ribofuranoside.
10. Compounds of the formula

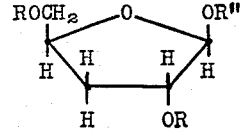

wherein R″ is a lower alkyl group, and R is selected from the group consisting of benzoyl and substituted benzoyl radicals.

11. Methyl - 2,5-di-O-benzoyl-3-deoxy-β-D-ribofuranoside.

12. Methyl - 2,5 - di-O-(p-nitrobenzoyl)-3-deoxy-β-D-ribofuranoside.

13. Compounds of the formula

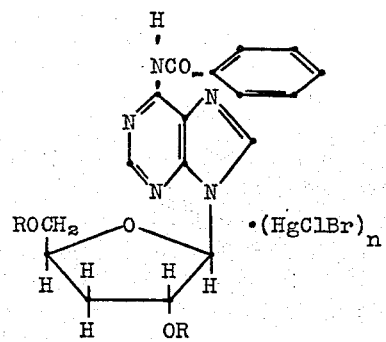

where R is selected from the group consisting of lower alkanoyl, aroyl, and substituted aroyl groups, and $n$ is selected from the group consisting of 0 and 1.

14. The compounds of claim 13 wherein R is benzoyl.
15. The compounds of claim 13 wherein R is acetyl.
16. The compounds of claim 13 wherein R is p-nitrobenzoyl.

References Cited by the Examiner

UNITED STATES PATENTS

| | | | |
|---|---|---|---|
| 2,719,844 | 10/1955 | Dimroth et al. | 260—211.5 |
| 2,876,230 | 3/1959 | Folkers et al. | 260—211.5 |
| 2,949,449 | 8/1960 | Hoffer | 260—211.5 |
| 3,207,750 | 9/1965 | De Boer et al. | 260—211.5 |

OTHER REFERENCES

Michelson, "The Chem. of Nucleosides and Nucleotides," 1963, pp. 22–23, Academic Press, New York, N.Y.

LEWIS GOTTS, *Primary Examiner.*

JOHNNIE R. BROWN, *Assistant Examiner.*